United States Patent [19]

Vogdes et al.

[11] Patent Number: 4,593,061
[45] Date of Patent: Jun. 3, 1986

[54] STABILIZED POLY(ARYL ETHER KETONE) COMPOSITIONS

[75] Inventors: Christine E. Vogdes, Mountain View; Brackin L. Andrews, San Carlos, both of Calif.

[73] Assignee: Raychem Corporation, Menlo Park, Calif.

[21] Appl. No.: 717,344

[22] Filed: Mar. 29, 1985

[51] Int. Cl.$^4$ .................................................. C08K 3/34
[52] U.S. Cl. ...................................... 524/417; 524/450
[58] Field of Search ............... 524/417, 444, 450, 612, 524/592, 912; 260/DIG. 16, DIG. 33; 528/220, 299

[56] References Cited

U.S. PATENT DOCUMENTS

| | | | |
|---|---|---|---|
| 3,428,595 | 2/1969 | Tsukada et al. | 524/450 |
| 3,925,307 | 9/1975 | Dahl et al. | 524/403 |
| 4,000,100 | 12/1976 | Baldyga | 524/394 |
| 4,250,081 | 2/1981 | Bode et al. | 524/450 |
| 4,420,582 | 12/1983 | Canard et al. | 524/450 |
| 4,425,448 | 1/1984 | Concannon et al. | 524/450 |
| 4,480,005 | 10/1984 | Brownscombe | 524/450 |
| 4,487,810 | 12/1984 | Ascarelli et al. | 524/450 |
| 4,540,727 | 9/1985 | Vogdes | 524/83 |

Primary Examiner—Veronica P. Hoke
Attorney, Agent, or Firm—Edith A. Rice; Herbert G. Burkard

[57] ABSTRACT

Poly(aryl ether ketones) are stabilized against crosslinking and thermooxidative degradation at elevated temperatures, e.g. temperatures typically used to melt process the polymer, by incorporating therein a particulate molecular sieve, for example, a crystalline aluminosilicate, such as a synthetic zeolite. The amount of molecular sieve is preferably about 0.5 to about 5% by weight based on the weight of the poly(aryl ether ketone).

20 Claims, No Drawings

STABILIZED POLY(ARYL ETHER KETONE) COMPOSITIONS

This invention relates to the stabilization of poly(aryl ether ketones).

Poly(aryl ether ketones) are thermoplastic polymers having excellent high temperature properties and solvent resistant. Their high temperature properties are due, at least in part, to their relatively high softening and melting points. These thermoplastic polymers can be formed into shaped articles by melt processing techniques such as extrusion and molding. Melt processing poly(aryl ether ketones) generally requires maintaining the polymer in molten form at temperatures of about 350° to about 450° C. for considerable periods of time, typically about one half hour or more. At these temperatures, the polymers tend to degrade.

In U.S. Pat. No. 3,925,307, to Dahl and Kameda, it is disclosed that an amphoteric metal oxide can be added to a poly(aryl ether ketone) to stabilize the polymer at melt processing temperatures. At the time the Dahl and Kameda patent was filed it was believed that the addition of an amphoteric metal oxide was equally effective regardless of the process used in preparing the polymer. The poly(aryl ether ketone) used by Dahl and Kameda were prepared using a reaction medium comprising boron trifluoride and hydrogen fluoride (HF/BF$_3$). It subsequently has been determined that such amphoteric metal oxides, while highly effective in stabilizing HF/BF$_3$-prepared polymer, are significantly less effective in stabilizing poly(aryl ether ketones) prepared in a reaction medium containing aluminum chloride.

It has now been surprisingly discovered that a particulate molecular sieve is highly effective as a stabilizers when incorporated into a poly(aryl ether ketone). The particulate molecular sieve is effective regardless of the reaction medium used in preparing the polymer, and thus can be used to stabilize polymer prepared in the presence of aluminum chloride.

SUMMARY OF THE INVENTION

One aspect of this invention provides a composition comprising an admixture of a poly(aryl ether ketone) and a particulate molecular sieve in an amount effective to stabilize the poly(aryl ether ketone). A second aspect of this invention provides a method of stabilizing a poly(aryl ether ketone) which comprises admixing said poly(aryl ether ketone) with a particulate molecular sieve in an amount effective to stabilize the poly(aryl ether ketone).

The term molecular sieve is used herein to mean a crystalline inorganic material having a plurality of microscopic interconnecting voids or channels extending therethrough. Such materials include crystalline aluminosilicates, silicoaluminophosphates, and aluminophosphates in acid form or as a salt with a group IA or group IIA element such as sodium, potassium, magnesium or calcium and silica polymorphs. Preferred molecular sieves for use in this invention are sodium aluminosilicates. The molecular sieve is incorporated in the poly(aryl ether ketone) in particulate form. Preferably the particle size is from about 1 to about 100 microns, most preferably from about 1 to about 20 microns. The amount of molecular sieve is preferably about 0.5 to about 5% by weight based on the weight of the poly(aryl ether ketone).

The term poly(aryl ether ketone) refers to polymers having the repeat unit of the formula

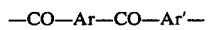

wherein Ar and Ar' are automatic moieties at least one of which containing a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

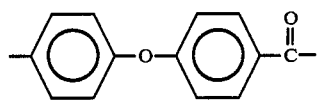

I

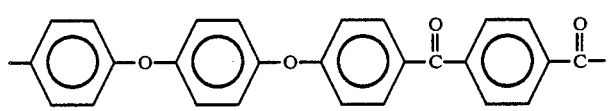

II

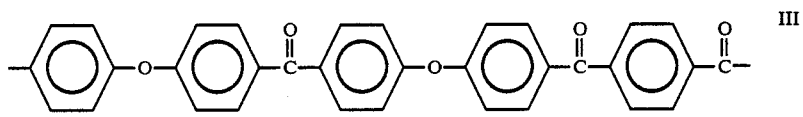

III

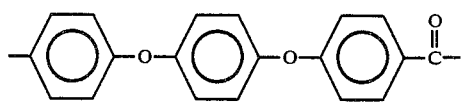

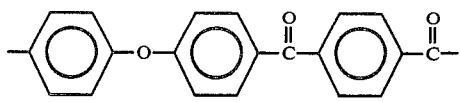

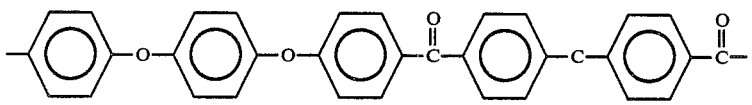

Poly(aryl ether ketones) can be prepared by known methods of synthesis. Preferred poly(aryl ether ketones) can be prepared by Friedel-Crafts polymerization of a monomer system comprising:

(I)
  (i) phosgene or an aromatic diacid dihalide together with
  (ii) a polynuclear aromatic comonomer comprising:
    (a) H—Ar″—O—Ar″—H
    (b) H—(Ar″—0)$_n$—AR″—H wherein n is 2 or 3
    (c) H—Ar″—0—Ar″—(CO—Ar″—0—Ar″)$_m$—H wherein m is 1, 2 or 3 or
    (d) H—(Ar″—0)$_n$Ar″—CO—Ar″—(0—Ar″)$_m$—H wherein m is 1, 2 or 3, and n is 2 or 3 or (II) an acid halide of the formula: H—Ar″—0—[(Ar′'—CO)$_p$—(Ar″—0)$_g$—(Ar″—CO)$_r$]$_k$—Ar″—CO—Z wherein Z is halogen, k is 0, 1 or 2, p is 1 or 2, q is 0, 1 or 2 and r is 0, 1 or 2; or (III) an acid halide of the formula: H—(Ar″—0)$_n$—Ar′'—Y wherein n is 2 or 3 and Y is CO—Z or CO—Ar′'—CO—Z where Z is halogen;

wherein each Ar″ is independently selected from substituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system;

and (C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example

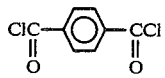

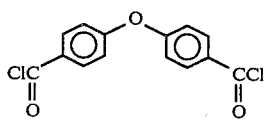

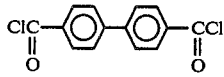

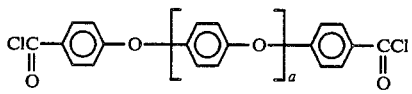

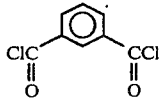

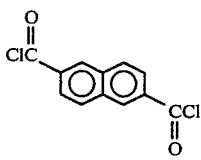

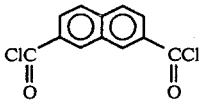

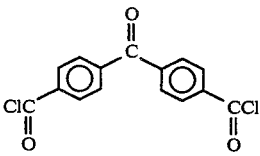

wherein a is 0–4.

Illustrated polynuclear aromatic comonomers which can be used with such diacid halides are:

(a) H—Ar″—O—Ar″—H, which includes, for example:

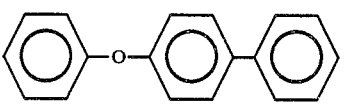

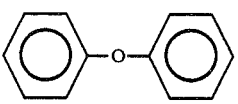

(b) H—(Ar″—0)$_n$—Ar″—H, which include, for example:

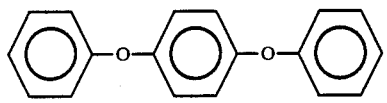

and

(c) H—Ar"—O—Ar"—(CO—Ar"—O—Ar")$_m$—H, which includes, for example:

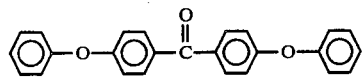

and (d) H—(Ar"—O)$_n$—Ar"—CO—Ar"—(O—Ar")$_m$—H which includes, for example:

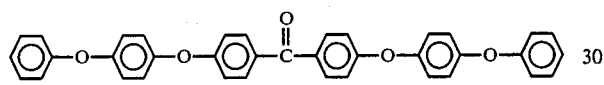

Monomer systems II and III comprise an acid halide. (The term acid halide is used herein to refer to a monoacid monohalide.) In monomer system II, the acid halide is of the formula:

H—Ar"—O—[(Ar"—CO)$_p$—(Ar"—O)$_q$—(Ar'-'—CO)$_r$]$_k$—Ar"—CO—Z

Such monomers include for example, where k=0

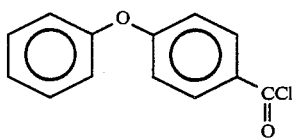

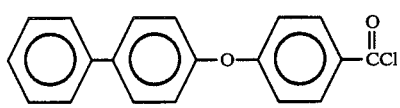

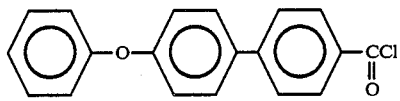

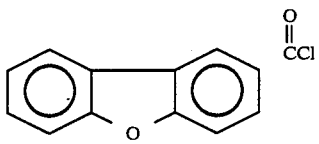

and where k=1

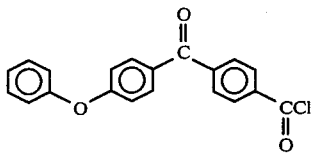

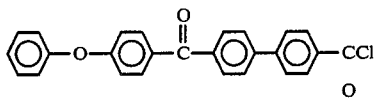

In monomer system III, the acid halide is of the formula

H—(Ar"—O)$_n$Ar"—Y

Examples of such acid halides include

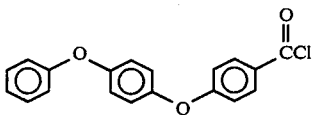

and

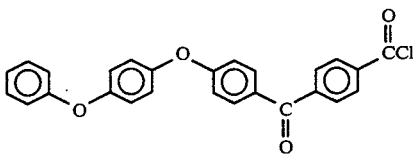

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long as one or more of the comonomers used contains at least one ether oxygen linkage. Such comonomers include for example:

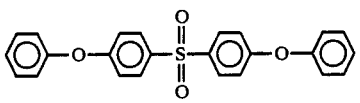

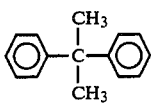

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

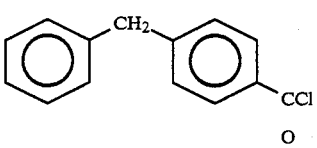

can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in commonly assigned co-pending U.S. application Ser. No. 594,503, filed Mar. 31, 1984, the disclosure of which is incorporated herein by reference.

The particulate molecular sieve and poly(aryl ether ketone) can be admixed by any appropriate technique. They may be blended in a Banbury or Brabender mixer, two-roll mill, screw extruder or the like.

Other additives such as pigments, extrusion aids, other polymers, flame retardants, co-antioxidants, U.V. stabilizers, inert fillers and the like can be incorporated into the poly(aryl ether ketone) if desired.

The following examples illustrate the stabilization of poly(aryl ether ketones) with particulate molecular sieves in accordance with this invention.

EXAMPLE

This example illustrates the use of molecular sieve to improve the melt stability of poly(carbonyl-p-phenylene-oxy-p-phenylene).

The molecular sieve was added to powdered poly(-carbonyl-p-phenylene-oxy-p-phenylene) in an amount equal to 1 weight percent of the composition. The resulting mixture was compacted at room temperature on a Brabender twin screw extruder. The compacted powder was then extruded at 390° C. on a ⅜ inch table top extruder. The rod-like extrudate was pelletized. The pellets were pressed into 1.5 inch diameter disks, 0.010 inch thick. The disks were held under 20,000 pounds ram pressure at 400° C. in the circular template between the sheets of stainless steel coated with a fluorocarbon mold release agent. The initial inherent viscosity ($IV_0$) and the inherent viscosity of each heat aged disk after 60 minutes ($IV_{60}$) and after 120 minutes ($IV_{120}$) were determined using the method of Sorenson et al, "Preparative Methods of Polymer Chemistry" *Interscience* (1968), at page 44 [0.1 g polymer dissolved in 100 ml of concentrated sulfuric acid at 25° C.].

The procedure was followed using Molecular Sieves 13X, 4A and 5A. The results obtained are shown in Table I and compared with the inherent viscosity of control samples and a sample containing gamma-alumina, a prior art stabilizer.

TABLE I

| Sample | Stabilizer | $IV_0$ | $IV_{60}$ | $IV_{120}$ |
|---|---|---|---|---|
| 1 | Mol Sieve 13X | 0.93 | 0.89 | 0.87 |
| 2 | Mol Sieve 13X | 0.94 | 0.89 | 0.94 |
| 3 | Mol Sieve 13X | 0.93 | 0.87 | 0.84 |
| 4 | Mol Sieve 4A | 0.93 | 0.87 | 0.85 |
| 5 | Mol Sieve 5A | 0.91 | 0.86 | 0.85 |
| 6 | $Al_2O_3$ | 0.93 | 0.70 | gel |
| 7 (Control) | None | 0.90 | 0.90 | gel |
| 8 (Control) | None | 0.92 | 0.79 | 0.76 (gel particles observed) |

We claim:

1. A composition comprising an admixture of poly(aryl ether ketone) and a particulate molecular sieve selected from the group consisting of crystalline aluminosilicates, silicoaluminophosphates, and aluminophosphates in acid form or as a salt with a group IA or group IIA element in an amount effective to stabilize the poly(aryl ether ketone) against thermooxidative degradation.

2. A composition in accordance with claim 1 wherein said poly(aryl ether ketone) has the repeat unit of the formula:

wherein Ar and Ar' are aromatic moieties, at least one of which contains a diaryl ether linkage forming part of the polymer backbone and wherein both Ar and Ar' are covalently linked to the carbonyl groups through aromatic carbon atoms.

3. A composition in accordance with claim 1 wherein said poly(aryl ether ketone) has the repeat unit of the formula:

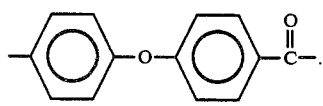

4. A composition in accordance with claim 1 wherein said poly(aryl ether ketone) has the repeat unit of the formula:

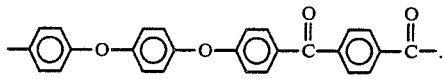

5. A composition in accordance with claim 1 wherein said poly(aryl ether ketone) has the repeat unit of the formula:

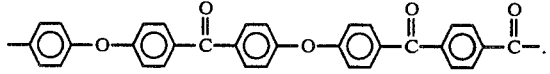

6. A composition in accordance with claim 1 wherein said poly(aryl ether ketone) has the repeat unit of the formula:

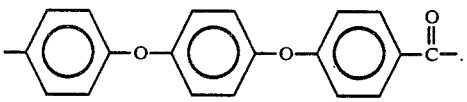

7. A composition in accordance with claim 1 wherein said poly(aryl ether ketone) has the repeat unit of the formula:

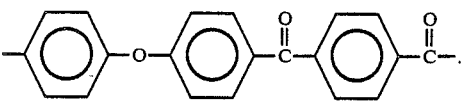

8. A composition in accordance with claim 1 wherein said poly(aryl ether ketone) has the repeat unit of the formula:

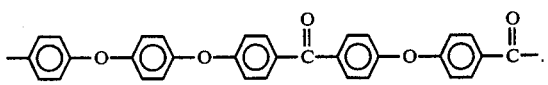

9. A composition in accordance with claim 1 wherein said molecular sieve comprises a crystalline aluminosilicate.

10. A composition in accordance with claim 1 wherein said molecular sieve is present in the composition in an amount from about 0.5 to about 5% by weight, based on the weight of the poly(aryl ketone).

11. A method of stabilizing a poly(aryl ether ketone) which comprises admixing a poly(aryl ether ketone) and a particulate molecular sieve in an amount effective to stabilize said poly(aryl ether ketone) against thermooxidative degradation, said sieve being selected from the group consisting of crystalline aluminosilicates, silicoaluminophosphates and aluminophosphates in acid form or as a salt with a group IA or group IIA element.

12. A method in accordance with claim 11 wherein said poly(aryl ether ketone) has the repeat unit of the formula:

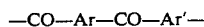

wherein Ar and Ar' are aromatic moieties, at least one of which contains a diaryl ether linkage forming part of the polymer backbone and wherein both Ar and Ar' are covalently linked to the carbonyl groups through aromatic carbon atoms.

13. A method in accordance with claim 11 wherein said poly(aryl ether ketone) has the repeat unit of the formula:

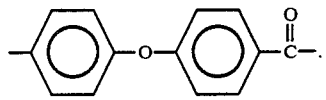

14. A method in accordance with claim 11 wherein said poly(aryl ether ketone) has the repeat unit of the formula:

15. A method in accordance with claim 11 wherein said poly(aryl ether ketone) has the repeat unit of the formula:

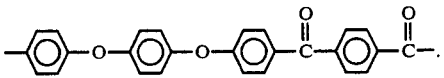

16. A method in accordance with claim 11 wherein said poly(aryl ether ketone) has the repeat unit of the formula:

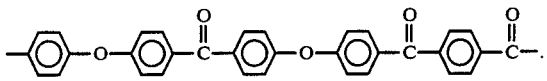

17. A method in accordance with claim 11 wherein said poly(aryl ether ketone) has the repeat unit of the formula:

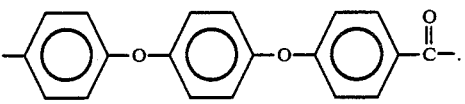

18. A method in accordance with claim 11 wherein said poly(aryl ether ketone) has the repeat unit of the formula:

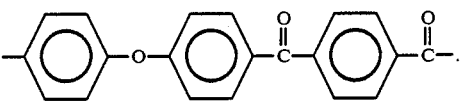

19. A method in accordance with claim 11 wherein said molecular sieve comprises a crystalline aluminosilicate.

20. A method in accordance with claim 11 wherein said molecular sieve is present in the composition in an amount from about 0.5 to about 5% by weight, based on the weight of the poly(aryl ether ketone).

* * * * *

UNITED STATES PATENT AND TRADEMARK OFFICE
CERTIFICATE OF CORRECTION

PATENT NO. : 4,593,061
DATED : June 3, 1986
INVENTOR(S) : VOGDES et al

It is certified that error appears in the above-identified patent and that said Letters Patent are hereby corrected as shown below:

Column 2, line 24, delete "automatic" and insert in lieu thereof -- aromatic --.

Signed and Sealed this

Thirtieth Day of September 1986

[SEAL]

Attest:

DONALD J. QUIGG

Attesting Officer   Commissioner of Patents and Trademarks